US010352320B2

(12) United States Patent
Mitsch (10) Patent No.: US 10,352,320 B2
(45) Date of Patent: Jul. 16, 2019

(54) VALVE CONNECTOR FOR INTEGRAL HIGH PRESSURE CYLINDER UNLOADER VALVE (71) Applicant: Westinghouse Air Brake Technologies Corporation, Wilmerding, PA (US)

(72) Inventor: Matthew D. Mitsch, Harrison City, PA (US)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 368 days.

(21) Appl. No.: 14/689,386

(22) Filed: Apr. 17, 2015

(65) Prior Publication Data
US 2016/0305422 A1 Oct. 20, 2016

(51) Int. Cl.
| F04B 53/10 | (2006.01) |
| F04B 39/00 | (2006.01) |
| F04B 39/12 | (2006.01) |
| F04B 53/14 | (2006.01) |
| F04B 53/16 | (2006.01) |
| F16K 3/22 | (2006.01) |
| F16L 15/08 | (2006.01) |
| F04B 49/03 | (2006.01) |
| F04B 53/00 | (2006.01) |

(52) U.S. Cl.
CPC ............. *F04B 53/10* (2013.01); *F04B 39/00* (2013.01); *F04B 39/0094* (2013.01); *F04B 39/121* (2013.01); *F04B 39/125* (2013.01); *F04B 49/03* (2013.01); *F04B 53/007* (2013.01); *F04B 53/14* (2013.01); *F04B 53/16* (2013.01); *F16K 3/22* (2013.01); *F16L 15/08* (2013.01)

(58) Field of Classification Search
CPC .... F04B 39/00; F04B 39/0094; F04B 39/121; F04B 39/125; F04B 49/03; F04B 53/007; F04B 53/10; F04B 53/14; F04B 53/16; F04B 39/10; F04B 49/035; F16K 3/22; F16K 17/02; F16L 15/08
USPC ........................................ 417/569; 137/513.7
See application file for complete search history.

(56) References Cited

U.S. PATENT DOCUMENTS 1,069,282 A * 8/1913 Oderman ................ F16K 1/487
251/214
1,108,903 A * 9/1914 Hancock ................. F04B 49/24
137/565.25

(Continued)

FOREIGN PATENT DOCUMENTS

EP  1160455 A2  12/2001

*Primary Examiner* — Patrick Hamo
*Assistant Examiner* — Joseph S. Herrmann
(74) *Attorney, Agent, or Firm* — The Webb Law Firm (57) ABSTRACT

A valve stem for use with an air compressor includes an upper portion, a connecting portion, an extended intermediate portion positioned between the upper portion and the connecting portion, and a lower tapered portion positioned on a bottom surface of the connecting portion. The valve stem may define a through hole extending from a top surface of the valve stem to a bottom surface of the valve stem. An upper portion of the through hole may be threaded. The upper portion may include a hexagonal cross-sectional shape. The lower tapered portion may include an inclined surface that transitions from a larger diameter to a smaller diameter. The valve stem allows for fluid connection from a pressurized volume to atmosphere.

15 Claims, 7 Drawing Sheets

(56) References Cited

U.S. PATENT DOCUMENTS

| | | | | |
|---|---|---|---|---|
| 1,450,333 A | * | 4/1923 | Reed | F04B 53/10 |
| | | | | 166/105.1 |
| 1,859,834 A | * | 5/1932 | May | F16K 41/10 |
| | | | | 251/267 |
| 2,036,846 A | * | 4/1936 | Aldinger | F04B 49/035 |
| | | | | 417/282 |
| 2,106,736 A | * | 2/1938 | Haas | F16K 3/22 |
| | | | | 251/158 |
| 2,961,148 A | | 11/1960 | Courtney, Jr. | |
| 3,542,406 A | * | 11/1970 | Metcalf | F16L 15/008 |
| | | | | 285/183 |
| 4,037,994 A | | 7/1977 | Bird | |
| 4,459,085 A | | 7/1984 | Tonegawa | |
| 4,634,093 A | * | 1/1987 | Schintgen | F16K 1/482 |
| | | | | 251/273 |
| 4,834,140 A | * | 5/1989 | Schmidt | B60T 11/30 |
| | | | | 137/381 |
| 5,411,100 A | * | 5/1995 | Laskaris | A62C 5/02 |
| | | | | 169/14 |
| 6,026,587 A | | 2/2000 | Cunkelman et al. | |
| 6,053,713 A | * | 4/2000 | Brown | F04B 39/064 |
| | | | | 417/569 |
| 6,123,515 A | | 9/2000 | Santoro, Jr. et al. | |
| 6,203,285 B1 | | 3/2001 | Wagner et al. | |
| 6,287,085 B1 | | 9/2001 | Goettel et al. | |
| 6,361,288 B1 | | 3/2002 | Sperry | |
| 6,447,017 B1 | * | 9/2002 | Gilbreath | F16L 33/2075 |
| | | | | 285/256 |
| 6,447,267 B1 | | 9/2002 | Varney et al. | |
| 6,474,748 B1 | | 11/2002 | Cunkelman | |
| 6,609,899 B1 | | 8/2003 | Finnamore | |
| 6,953,325 B2 | * | 10/2005 | Weber | F04B 27/1036 |
| | | | | 137/513.7 |
| 9,010,364 B2 | * | 4/2015 | Tokach | F16K 15/044 |
| | | | | 137/513.7 |
| 9,562,527 B2 | | 2/2017 | Spiegl et al. | |
| 2006/0013698 A1 | | 1/2006 | Pervaiz et al. | |
| 2010/0158709 A1 | | 6/2010 | Bassett | |
| 2012/0107159 A1 | | 5/2012 | Lifson et al. | |
| 2012/0192710 A1 | | 8/2012 | Moore et al. | |
| 2013/0280095 A1 | | 10/2013 | Worden et al. | |

* cited by examiner

VALVE CONNECTOR FOR INTEGRAL HIGH PRESSURE CYLINDER UNLOADER VALVE

BACKGROUND OF THE INVENTION

Field of the Invention

The present disclosure relates to the field of air compressors adapted for supplying compressed air to pneumatic units and, in particular, to a valve connector for an integral high pressure cylinder unloader valve used on a railway vehicle air compressor.

Description of Related Art

The use of a multiple stage, multiple cylinder air compressor is well known in the art. It is common practice to use a multiple stage, multiple cylinder air compressor on a locomotive or other railway vehicle to provide compressed air that is consumed by various pneumatic devices throughout the locomotive and railcars to provide a variety of functions. The primary function is to operate the locomotive and railcar brakes. Several air compressors currently used in the railway industry are designed with an unloader system which, when activated with pilot air pressure, will, under normal operation, release the air pressure contained or "bottled" in the volume between a high pressure compressor head and a high pressure piston. The pilot air pressure is typically delivered from a locomotive compressor magnet valve (CMV), which is not provided as a part of the compressor assembly. The CMV provides pilot air pressure to a compressor unloader system to change the air compressor's state to an unloaded state (not pressurizing air) and does not provide pilot air pressure to the compressor unloader system to change the air compressor's state to a loaded state (pressurizing air). Pilot air pressure must be maintained to keep the air compressor in an unloaded state. In certain scenarios, during improper locomotive operation, power is cut to the CMV with the air compressor in an unloaded state. In these undesirable scenarios, downstream air pressure may be fed back into the volume contained between the high pressure cylinder head and the high pressure piston. When the locomotive is placed back into proper operation and the CMV once again sends pilot air to the compressor unloader system, the air pressure now contained within the volume prevents the compressor unloader system from properly actuating. In this scenario, the compressor unloader system will not dissipate the air pressure contained in the volume.

Many locomotive air compressors are equipped with motors rated with just enough horsepower for normal operation and startup, where the air compressor will not be pressurized in the volumes contained between the low pressure heads and the low pressure pistons, and in the volumes contained between the high pressure heads and the high pressure pistons. Since the motors are not adequately sized to start an air compressor when an initial air pressure is already contained in these volumes, many motors will stall when attempting to start in this undesired scenario caused by improper locomotive setup.

Therefore, there is a current need for an air compressor with an integral high pressure cylinder unloader valve that allows the air pressure trapped in the volumes to be exhausted to atmosphere. There is also a current need for a quick and efficient method of machining an air compressor head to provide a means for dissipating the air pressure contained in the volumes. There is also a current need for a valve connector that provides fluid communication between the volumes and atmosphere to effectively dissipate the air pressure from the volumes.

SUMMARY OF THE INVENTION

Accordingly, and generally, a valve connector for use with an air compressor and a method of providing the valve connector on a cylinder head of the air compressor are described herein to address and/or overcome some or all of the deficiencies or drawbacks associated with existing air compressors.

In accordance with one aspect, a valve connector for use with an air compressor may include an upper portion, a connecting portion, an extended intermediate portion positioned between the upper portion and the connecting portion, and a lower tapered portion positioned on a bottom surface of the connecting portion.

The valve connector may define a through hole extending from a top surface of the valve connector to a bottom surface of the valve connector. An upper portion of the through hole may be threaded. The upper portion may include a hexagonal cross-sectional shape. The lower tapered portion may include an inclined surface that transitions from a larger diameter to a smaller diameter. An O-ring may be positioned around the extended intermediate portion and against a bottom surface of the upper portion. The extended intermediate portion may have a smaller diameter than the upper portion and the connecting portion. A diameter of the upper portion may be greater than a diameter of the extended intermediate portion, a diameter of the connecting portion, and a diameter of the tapered lower portion.

In accordance with another aspect, an air compressor for a railway vehicle may include a compressor housing, at least one piston cylinder supported in the compressor housing, the at least one piston cylinder including a cylinder head, a crankshaft assembly supported by the compressor housing and linked to a piston of the at least one piston cylinder, and a valve connector provided on the cylinder head of the at least one piston cylinder. The valve connector may include an upper portion, a connecting portion, an extended intermediate portion positioned between the upper portion and the connecting portion, and a lower tapered portion positioned on a bottom surface of the connecting portion.

The connecting portion may be threaded. A passageway may be defined in the cylinder head. The passageway may include a first passage, a second passage, and a transition passage provided between the first and second passages. The valve connector may be configured for insertion into the first passage of the passageway defined in the cylinder head. The transition passage may include a tapered portion. The tapered portion of the transition passage and the lower tapered portion of the valve connector may be configured to correspond to one another. The first passage of the passageway may include a threaded portion. The threaded portion of the first passage may be threadedly coupled to the connecting portion of the valve connector. The valve connector may define a through hole extending from a top surface of the valve connector to a bottom surface of the valve connector. An upper portion of the through hole may be threaded. An unloader valve may be coupled to the upper portion of the valve connector. A diameter of the upper portion may be greater than a diameter of the extended intermediate portion, a diameter of the connecting portion, and a diameter of the tapered lower portion. The extended intermediate portion may have a smaller diameter than the upper portion and the connecting portion.

In accordance with another aspect, a method of providing a valve connector in a cylinder head of an air compressor may include steps of defining a passageway from a top surface of a cylinder head to a bottom surface of the cylinder head; providing a valve connector including an upper portion, a connecting portion, an extended intermediate portion positioned between the upper portion and the connecting portion, and a lower tapered portion positioned below the connecting portion; and threadedly connecting the connecting portion of the valve connector with a threaded surface on a portion of the passageway.

The connecting portion may be threaded. The passageway may include a first passage, a second passage, and a transition passage positioned between the first passage and the second passage. The threaded surface of the passageway may be provided in the first passage. The transition passage may be tapered to correspond to the lower tapered portion of the valve connector. The first passage may be positioned between a top surface of the cylinder head and the transition passage. The second passage may be positioned between a bottom surface of the cylinder head and the transition passage. The method may further include the step of tapping the threaded surface of the passageway to create a female or male threaded surface.

Further details and advantages will be understood from the following detailed description read in conjunction with the accompanying drawings.

DESCRIPTION OF THE DISCLOSURE

For purposes of the description hereinafter, spatial orientation terms, as used, shall relate to the referenced aspect as it is oriented in the accompanying drawings, figures, or otherwise described in the following detailed description. However, it is to be understood that the aspects described hereinafter may assume many alternative variations and configurations. It is also to be understood that the specific components, devices, features, and operational sequences illustrated in the accompanying drawings, figures, or otherwise described herein are simply exemplary and should not be considered as limiting.

Figure 1:
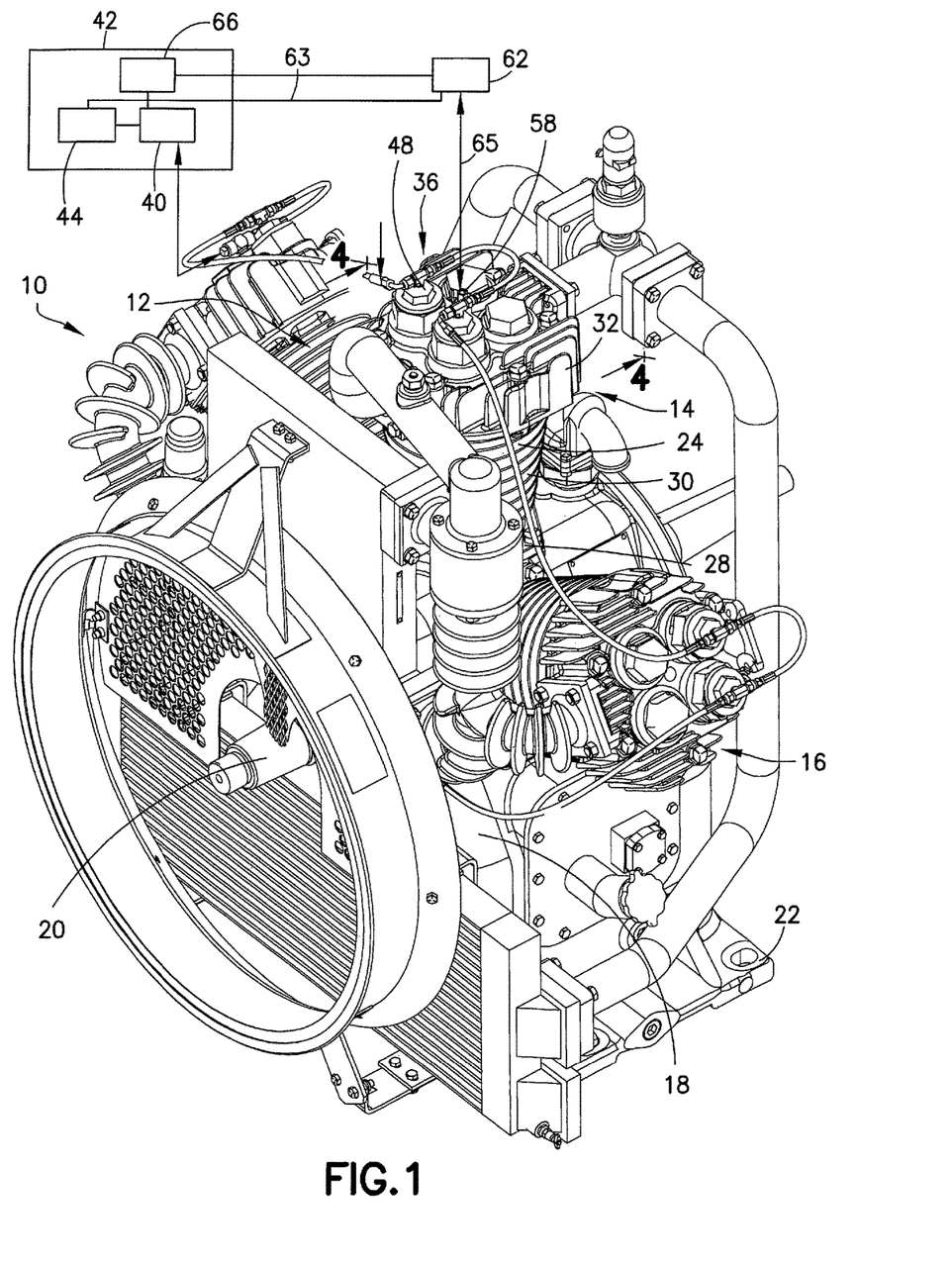
FIG. 1 is a front perspective view of an air compressor and unloader valve system in accordance with one aspect of the present disclosure.
Figure 2:
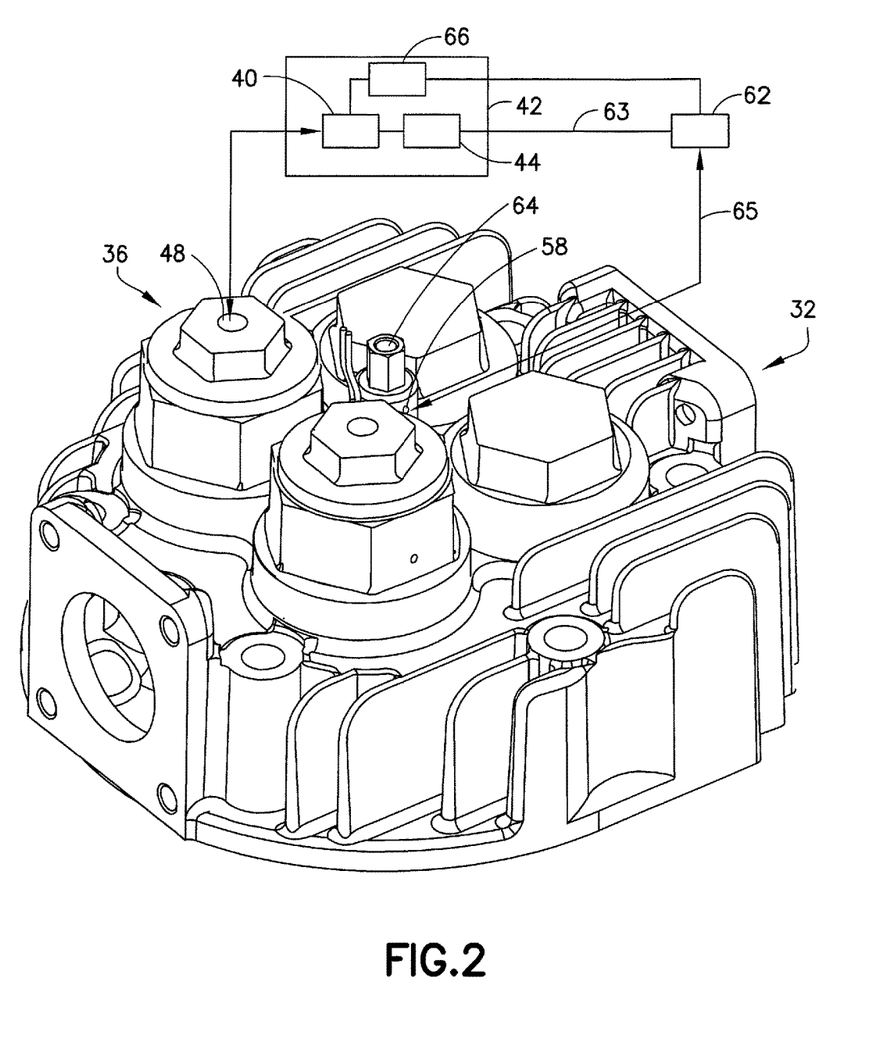
FIG. 2 is a front perspective view of the cylinder head and unloader valve system shown in FIG. 1.
Figure 3:
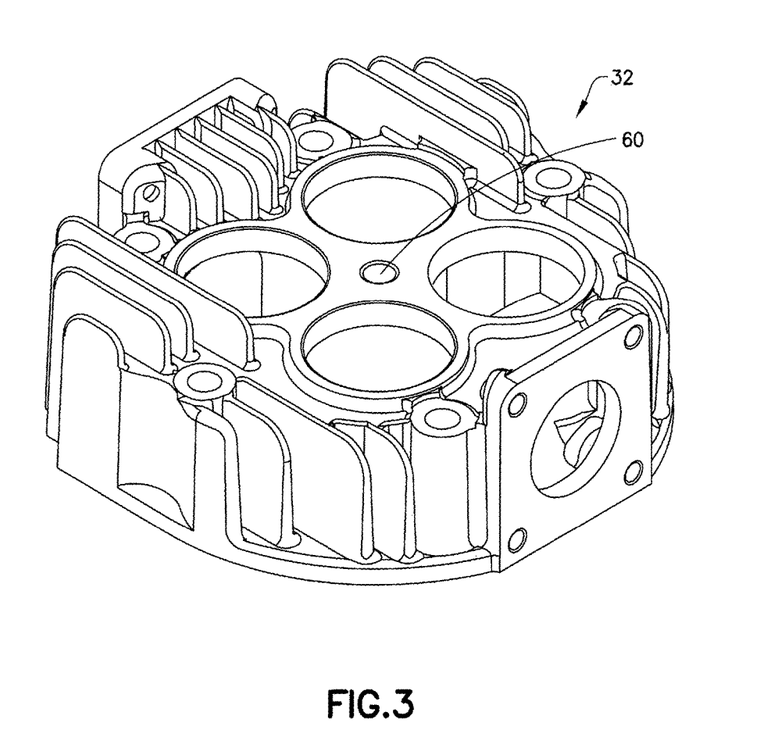
FIG. 3 is a front perspective view of the cylinder head of FIG. 2.

Referring to FIGS. 1-3, an air compressor 10 according to one aspect is shown. As shown, the air compressor 10 may be a multi-cylinder air compressor including at least a first piston cylinder 12, a second piston cylinder 14, and a third piston cylinder 16. It is also to be understood that additional piston cylinders may be provided on the air compressor 10. In one aspect, the air compressor 10 may be an oil-free air compressor. One example of such an oil-free air compressor is disclosed in U.S. Patent Application Publication No. 2012/0192710, entitled "Oil-Free Air Compressor for Rail Vehicle", the disclosure of which is hereby incorporated by reference in its entirety. The first piston cylinder 12, the second piston cylinder 14, and the third piston cylinder 16 may be supported by a compressor housing or crankcase 18 and are each driven by a crankshaft assembly 20 disposed within the compressor housing 18 and rotationally supported by the compressor housing 18. The foregoing components of the air compressor 10 are described in detail herein. A support member 22 may be fastened to a bottom surface of the air compressor 10. It is also contemplated that the support member 22 may be integrally formed with the compressor housing 18. The support member 22 may be used to mount the air compressor 10 on a locomotive or railway vehicle.

The first piston cylinder 12, the second piston cylinder 14, and the third piston cylinder 16 may be of substantially similar construction with the first piston cylinder 12 operating as the first cylinder, the second piston cylinder 14 operating as the second cylinder, and the third piston cylinder 16 operating as the third cylinder. In one aspect of the disclosure, the first piston cylinder 12 and the third piston cylinder 16 may be low pressure piston cylinders. In this same aspect, the second piston cylinder 14 may be a high pressure piston cylinder. The second piston cylinder 14 may be generally smaller than and generally have a smaller diameter than the first piston cylinder 12 and the third piston cylinder 16. In one aspect, the first piston cylinder 12, the second piston cylinder 14, and the third piston cylinder 16 may be radially configured about a longitudinal axis of the air compressor 10. The piston cylinders 12, 14, 16 may interface with an outer circumferential surface of the air compressor 10.

Figure 4:
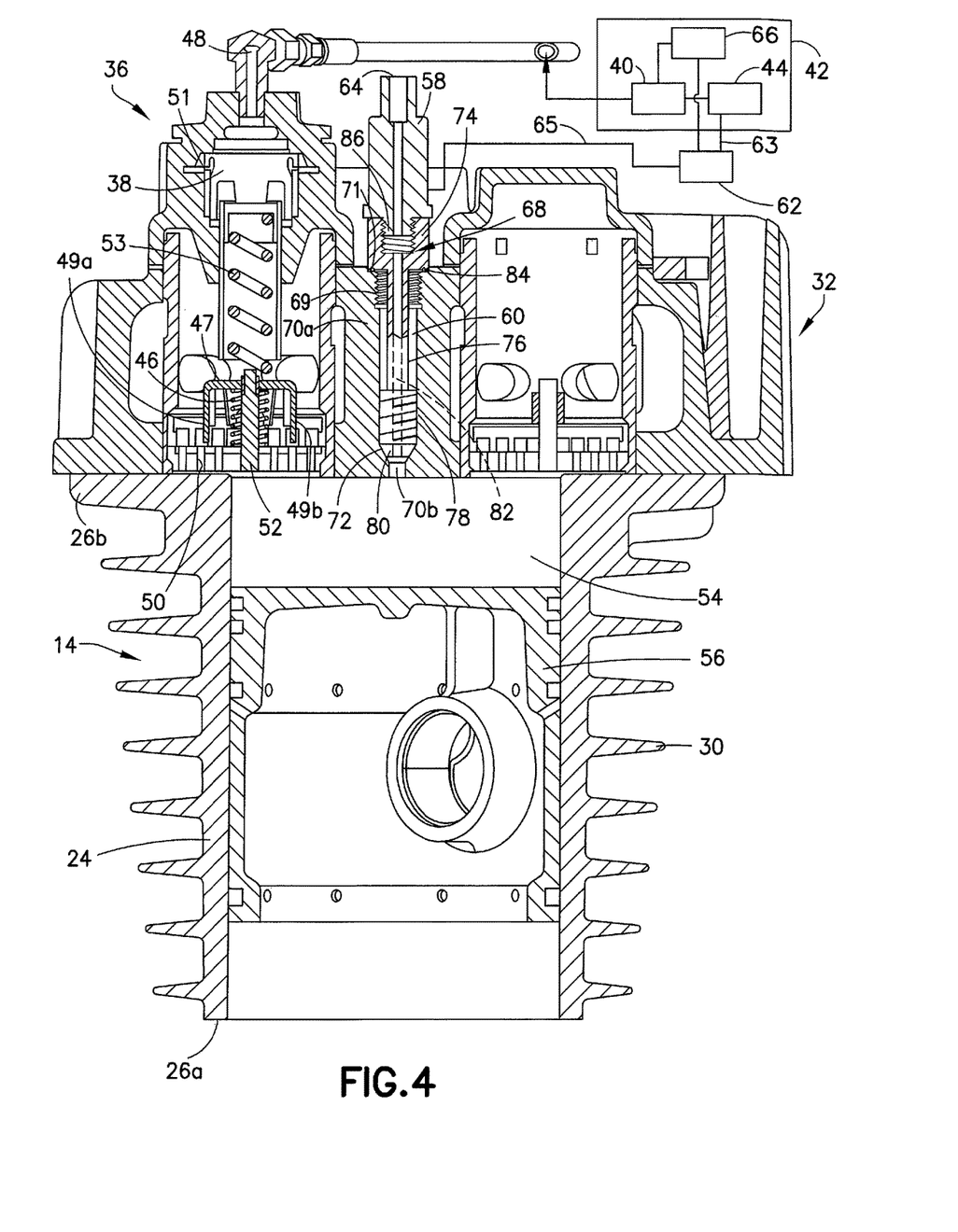
FIG. 4 is a cross-sectional view of the piston cylinder, cylinder head, and unloader valve system of FIG. 1 along line 4-4.

With reference to FIGS. 2-4, a description of the second piston cylinder 14 is now provided. Since the first piston cylinder 12 and the third piston cylinder 16 may be generally similar in construction with the second piston cylinder 14, a description of only the second piston cylinder 14 is provided. However, it is to be understood that the first piston cylinder 12 and the third piston cylinder 16 are substantially similar in construction and operation. The second piston cylinder 14 may include a cylindrical housing 24 that has a first end 26a adapted to be inserted into a corresponding opening, as described herein, in the compressor housing 18, and a second end 26b. The cylindrical housing 24 may be formed with a flange 28 located proximal of the first end 26a for interfacing with the exterior of the compressor housing 18. Heat-dissipating fins 30 may be provided about the outer circumference of the cylindrical housing 24, and the cylindrical housing 24 may be formed of any suitable material providing sufficient strength and heat-dissipating characteristics, such as aluminum.

A cylinder head 32 may be secured to the second end 26b of the cylindrical housing 24. The cylinder head 32 may house a compressor unloader system 36 (hereinafter "unloader system 36") positioned on the cylinder head 32. The unloader system 36 may include a biasing member 46 that is configured to keep the unloader system 36 in a de-activated position. When in a de-activated position, the air compressor 10 is in a loaded state. In one aspect, the biasing member 46 may be a spring. The biasing member 46 may be configured to push upwardly on an unloader finger plate 47 to remove any downward force applied from the unloader finger plate 47 to an inlet valve plate 50. By lifting unloader fingers 49a, 49b of the unloader finger plate 47 from the inlet valve plate 50, the biasing member 46 also unseats an unloader valve 38 from an unloader valve seat 51 through the use of a damping member 53. In one aspect, the damping member 53 may be a spring. In one aspect, a compressor magnet valve 40 (hereinafter "CMV 40") may be configured to direct pilot air pressure to the unloader system 36. In one aspect, the CMV 40 may be a two-way valve.

The CMV 40 may operate the unloader system 36 in at least two different positions. In a first position, when the air compressor 10 is in a loaded state (pressurizing air), the CMV 40 may be de-energized so that the unloader system 36 may be kept in a de-activated position. In this first position, the CMV 40 does not direct pilot air pressure from a pilot air reservoir 44 to the unloader system 36. Therefore, when the unloader system 36 is in the first position and the CMV 40 is de-energized, the unloader system 36 is kept in the de-activated position (loaded state).

In a second position, when the air compressor 10 is in an unloaded state (not pressurizing air), the CMV 40 may supply pilot air pressure to a pilot pressure inlet 48 of the unloader system 36. During this operation, the CMV 40 is energized, thereby opening the CMV 40. By opening the CMV 40, pilot air pressure is permitted to flow through the CMV 40 into the unloader system 36 via the pilot pressure inlet 48. The pilot air pressure is directed against the unloader valve 38 to push the unloader valve 38 downward against the damping member 53. As the damping member 53 is pushed downward, the unloader finger plate 47 is pushed against the inlet valve plate 50. The force applied by the unloader finger plate 47 on the inlet valve plate 50 causes the inlet valve plate 50 to lift from its seat and open an unloader system inlet 52. The air compressor 10 may be in the activated state when the inlet valve plate 50 is held open by the force applied by the unloader pilot air pressure to the inlet valve plate 50 through the unloader valve 38, the damping member 53, and the unloader finger plate 47. With the compressor unloader system 36 in the activated state, the air compressor 10 may be in an unloaded state.

In certain scenarios, during improper locomotive operation, power may be cut to the CMV 40 with the air compressor 10 in an unloaded state. With the power being cut to the CMV 40, the CMV 40 may be de-energized and the unloader system 36 returned to a de-activated position. Air pressure downstream from the air compressor 10 may feed back into a volume 54 contained between the cylinder head 32 and a piston 56 supported in the cylindrical housing 24 of the second piston cylinder 14. The downstream air pressure may be air pressure from a main reservoir (not shown) of the railway vehicle 42. In this scenario, when the railway vehicle 42 is placed back into proper operation and the CMV 40 is energized again and capable of sending pilot air pressure to the unloader system 36, the downstream air pressure may remain trapped or contained within the volume 54 between the cylinder head 32 and the piston 56. This may occur when the force applied by the unloader pilot air pressure to the inlet valve plate 50 through the unloader valve 38, the damping member 53, and the unloader finger plate 47 is not great enough to overcome the opposing force applied to the opposite side of the inlet valve plate 50 by the trapped air pressure. In current air compressors, this trapped downstream air pressure may prevent the air compressor 10 from properly starting. Therefore, the unloader system 36 may not dissipate the downstream air pressure contained in the volume 54. As previously discussed, most current air compressors do not include motors rated with enough horsepower to start the air compressor with the downstream air pressure initially contained in the volume 54.

As shown in FIGS. 1-4, the present disclosure provides an arrangement that exhausts this in-cylinder air pressure to atmosphere prior to the restarting of the air compressor 10 and the motor (not shown). This arrangement is configured to exhaust the in-cylinder air pressure from the volume 54 to atmosphere so that the air compressor 10 may be activated without problems due to the limited horsepower provided by the motor.

An unloader valve 58 may be provided on the cylinder head 32 to assist in exhausting the downstream air pressure contained in the volume 54. In one aspect, the unloader valve 58 may be an electrically-activated, two-way solenoid valve. The unloader valve 58 may be configured to fluidly connect the volume 54 to atmosphere through a passageway 60 defined in the cylinder head 32. The passageway 60 may extend from the volume 54 to atmosphere through a top surface of the cylinder head 32. The unloader valve 58 may be fastened to a top surface of the cylinder head 32. Further details of how the unloader valve 58 may be fastened to the cylinder head 32 are provided below. The unloader valve 58 may operate in at least two positions. In a first position, during normal operation of the air compressor 10, the unloader valve 58 may be positioned in a closed state. In one aspect, the solenoid valve may be energized. In a second position, during a shutdown operation of the air compressor 10, the unloader valve 58 may be positioned in an open state. In one aspect, the solenoid valve may be de-energized. A shutdown operation of the air compressor 10 is meant to include scenarios where the air compressor 10 is turned off or shut down either intentionally or unintentionally.

In one aspect, the unloader valve 58 may be pneumatically activated by a compressor magnet valve 62 (hereinafter "CMV 62"). During normal operation of the railway vehicle 42, the CMV 62 may be energized. During a shutdown operation of the railway vehicle 42, the CMV 62 may be de-energized. The CMV 62 may be connected to the pneumatically activated unloader valve 58 via a pilot line 65. The CMV 62 may be connected to the pilot air reservoir 44 on the railway vehicle 42 via a supply line 63. In one aspect, when the CMV 62 is energized, the CMV 62 is in the closed or vented state. In this state, the supply line 63 is not connected to the pilot line 65 and the unloader valve 58 is closed. When the CMV 62 is de-energized, the CMV 62 is in an open or activated state and the supply line 63 is connected to the pilot line 65 of the unloader valve 58. In this state, air pressure in the pilot line 65 of the unloader valve 58 holds the unloader valve 58 open. This allows downstream air pressure from the volume 54 to be directed out of the passageway 60 to atmosphere through an exhaust port 64 on the unloader valve 58. By removing the downstream air pressure from the volume 54 via the unloader valve 58, the motor may restart the air compressor 10 as desired so that pressurized air may be provided to the railway vehicle 42. By eliminating the motor stalls, the unloader valve 58 arrangement improves the railway vehicle's 42 operational reliability.

With reference to FIG. 4, a controller 66 on the railway vehicle 42 may be provided in connection with the CMVs 40, 62 to permit the CMVs 40, 62 to be opened at any time desired by a locomotive control logic. Instead of opening each CMV 40, 62 when the CMVs 40, 62 are de-energized by a locomotive power shutdown, the CMVs 40, 62 may be opened by the controller 66 whenever desired. In one aspect, the controller 66 may send a short duration open signal to the CMVs 40, 62 just prior to an air compressor 10 motor start signal to exhaust any trapped pressurized air in the volume 54. The controller 66 may be hard-wired to the CMVs 40, 62 or may be remotely connected to the CMVs 40, 62. The controller 66 may consist of one element of a larger control logic on the railway vehicle 42.

Figure 5:
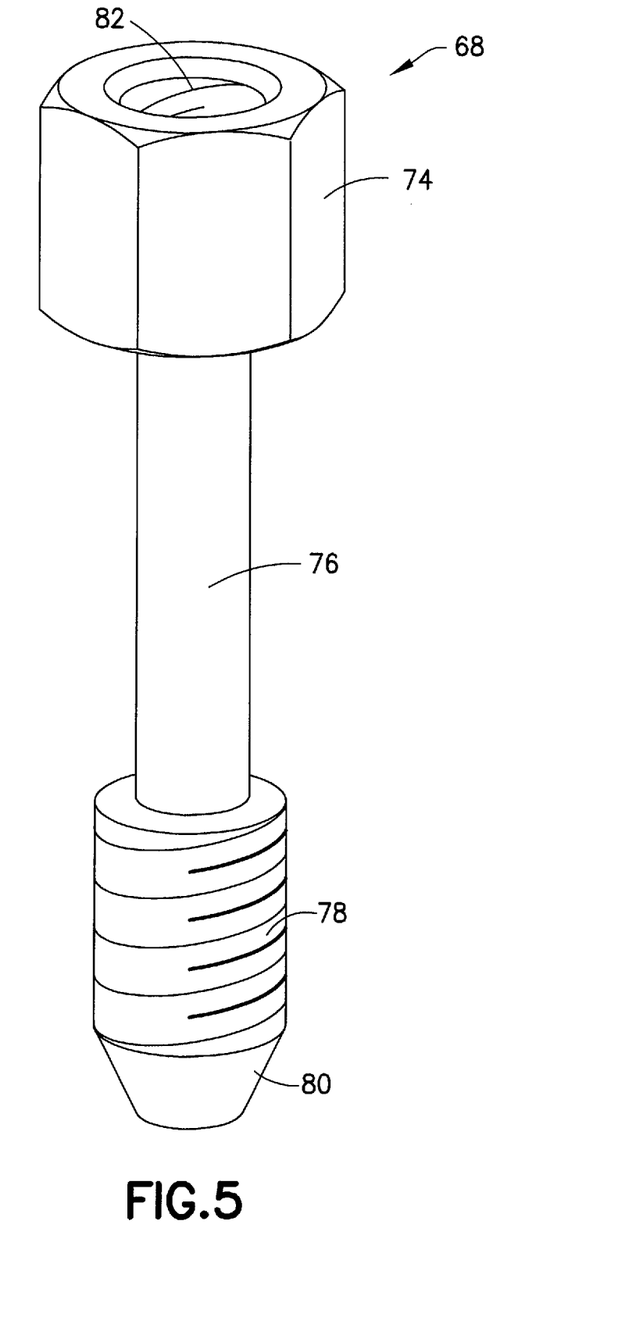
FIG. 5 is a front perspective view of a valve connector in accordance with one aspect of the present disclosure.
Figure 8:
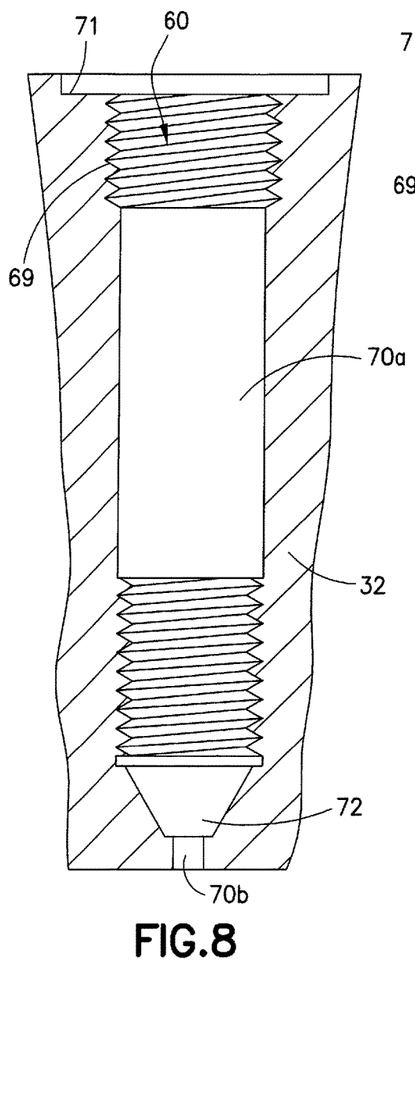
FIG. 8 is a cross-sectional view of the cylinder head of FIG. 1 showing a passageway defined therein.
Figure 9:
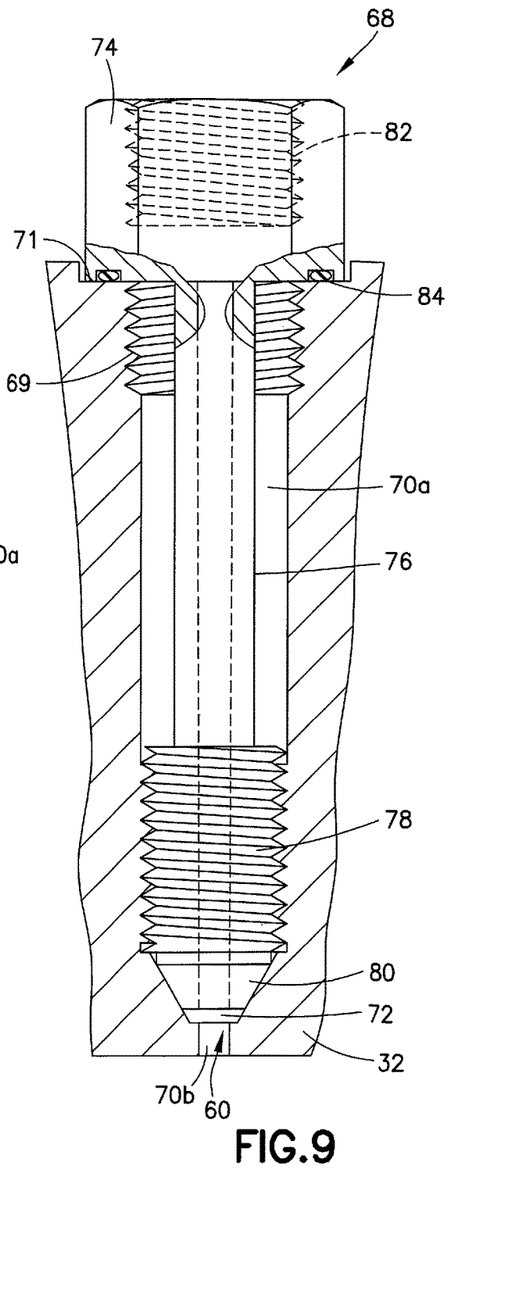
FIG. 9 is a cross-sectional view of the cylinder head of FIG. 1 showing the stem valve of FIG. 5 inserted in the passageway.

With reference to FIGS. 5, 8, and 9, a further aspect of the unloader system 36 is described. A valve connector 68 may be provided in the cylinder head 32 to establish a connection between the unloader valve 58 and the passageway 60. In another aspect, the passageway 60 may be machined or provided in the center of the cylinder head 32. In one aspect, to integrate the valve connector 68 into the unloader system 36, the passageway 60 may be drilled out of the cylinder head 32. In current cylinder heads, the passageway 60 may not extend from the top of the cylinder head 32 entirely to the bottom surface of the cylinder head 32. In current cylinder heads, the passageway 60 may only extend down a portion of the cylinder head 32 from the top surface of the cylinder head 32. This portion of the passageway is typically used to threadedly insert an eye-bolt (not shown) so an operator may lift the air compressor 10 by attaching a lifting mechanism to the eye-bolt.

In one aspect, however, the passageway 60 may be machined to define two portions, a first passage 70a and a second passage 70b. The first passage 70a may be provided towards the top portion of the cylinder head 32 and the second passage 70b may be provided towards a bottom portion of the cylinder head 32. A lower portion of the first passage 70a may be threaded to receive a corresponding threaded component. In one aspect, the lower portion of the first passage 70a may be female tapped into the cylinder head 32. The second passage 70b may be drilled into the cylinder head 32 to establish fluid communication between the volume 54 and the unloader valve 58. The first passage 70a may have a larger diameter than the second passage 70b. A transition passage 72 may be provided between the first passage 70a and the second passage 70b. The transition passage 72 may be conically shaped so that the passageway 60 transitions from the larger diameter size of the first passage 70a to the smaller diameter size of the second passage 70b. Therefore, the transition passage 72 may include inclined surfaces between the first passage 70a and the second passage 70b. By machining the first passage 70a and the second passage 70b into the cylinder head 32, current air compressors may be retrofitted to receive the valve connector 68. Regardless of the brand or type of air compressor, the passageway 60 of the cylinder head 32 may be retrofitted to use the valve connector 68. The valve connector 68 permits the use of existing air compressor cylinder heads to be used with only a small amount of simple machining performed on the cylinder head 32. This may be advantageous as it permits the application of this disclosure to the existing global fleet of railway vehicle air compressors without requiring an operator or customer to buy a new air compressor including the valve connector 68.

Figure 6:
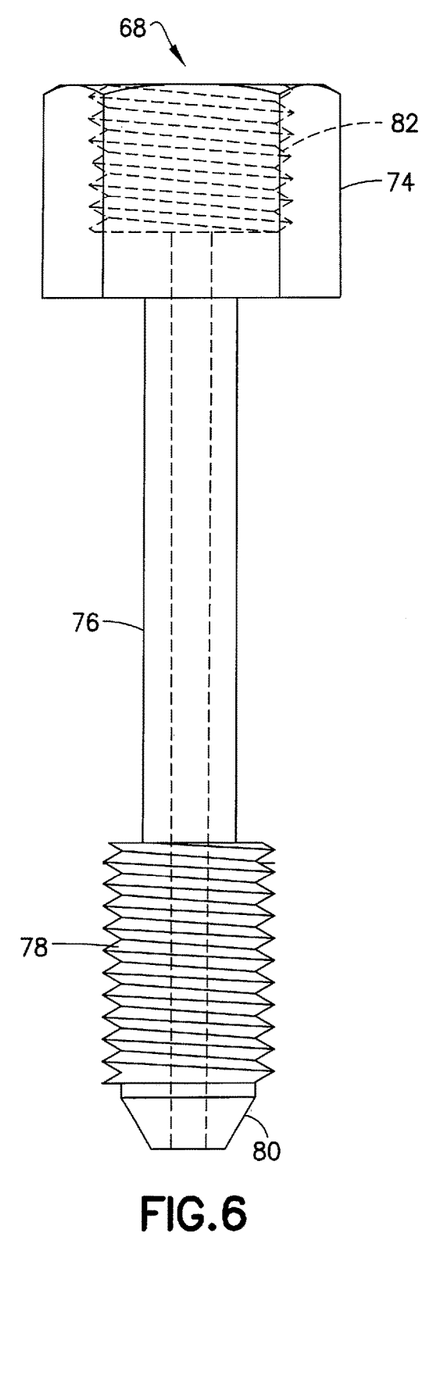
FIG. 6 is a front view of the valve connector of FIG. 1.
Figure 7:
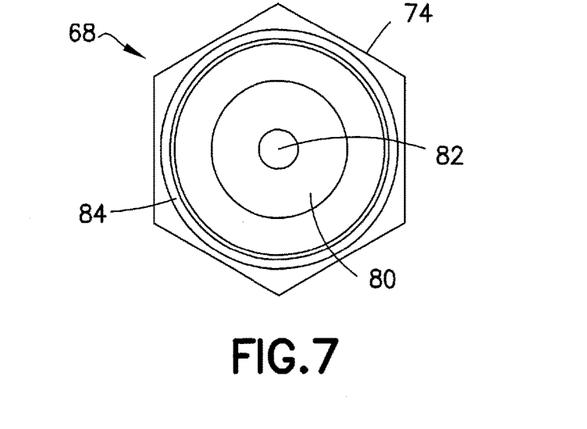
FIG. 7 is an end view of the valve connector of FIG. 1.

As will be explained below in detail, the valve connector 68 may be configured to quickly and cost-effectively attach the unloader valve 58 onto the cylinder head 32 of the air compressor 10. As shown in FIGS. 5-7, the valve connector 68 may include an upper portion 74, an extended intermediate portion 76, a threaded portion 78, and a tapered lower portion 80. The threaded portion 78 may also be referred to as a connecting portion. The upper portion 74 may be positioned above the extended intermediate portion 76, which may be positioned above the threaded portion 78, which may be positioned above the tapered lower portion 80. In one aspect, the upper portion 74 may have a greater diameter compared to the extended intermediate portion 76, the threaded portion 78, and the tapered lower portion 80.

In one aspect, the upper portion 74 may have a hexagonal cross-sectional shape to allow for the use of common tools for rotating the valve connector 68. It is to be understood, however, that alternative cross-sectional shapes may be used as required. The extended intermediate portion 76 may be substantially cylindrical and include a smooth outer surface. The extended intermediate portion 76 may extend from the upper portion 74 to the threaded portion 78. The extended intermediate portion 76 may have a smaller diameter than the upper portion 74 and the threaded portion 78. The threaded portion 78 may include a male thread configured to engage with the female thread of the first passage 70a of the passageway 60 in the cylinder head 32. The threaded portion 78 may have a diameter larger than the extended intermediate portion 76 and the tapered lower portion 80. The threaded portion 78 may have a diameter smaller than the upper portion 74. The tapered lower portion 80 may include a conical portion that tapers from a larger diameter to a smaller diameter. The tapered lower portion 80 may include an inclined outer surface configured to provide a taper from an upper end of the lower portion 80 to an opposing lower end of the lower portion 80. In one aspect, the tapered lower portion 80 may have a tapered conical portion that corresponds to the tapered conical portion of the transition passage 72 of the passageway 60.

The valve connector 68 may also include a through hole 82 that extends from a top surface of the valve connector 68 to a bottom surface of the valve connector 68. The through hole 82 may be configured to permit pressurized air from the volume 54 to exhaust from the exhaust port 64 of the unloader valve 58. When the valve connector 68 is positioned in the cylinder head 32, the bottom of the through hole 82 may be provided in fluid communication between the passageway 60 and the unloader valve 58. An upper portion of the through hole 82 may be threaded to receive a corresponding threaded portion 86 of the unloader valve 58 (see FIG. 4). In this manner, the unloader valve 58 and the valve connector 68 may be connected to one another, and thereby the unloader valve 58 may be connected to the cylinder head 32.

With reference to FIGS. 8 and 9, the valve connector 68 may be inserted into the cylinder head 32 by rotating the upper portion 74 relative to the cylinder head 32. The extended intermediate portion 76, the threaded portion 78, and the tapered lower portion 80 of the valve connector 68 may be inserted into the passageway 60. In one aspect, an O-ring 84 may be positioned around the extended intermediate portion 76 to abut the bottom surface of the upper portion 74. The O-ring 84 may be used to create a seal between the valve connector 68 and the cylinder head 32. Due to the extended length of the first passage 70a of the passageway 60 in typical cylinder heads 32, the valve connector 68 may be configured not to reduce the amount of clearance volume created between the unloader valve 58 and piston 56. Therefore, the extended intermediate portion 76 may be configured to extend the threaded portion 78 further into the first passage 70a, thereby reducing the amount of pressurized air that is permitted to build up in the passageway 60. Instead, the pressurized air primarily remains in the volume 54, thereby maintaining the clearance volume in the second piston cylinder 14. By bringing the valve connector 68 closer to the volume 54, the passageway 60 volume between the volume 54 and the valve connector 68 is reduced, thereby keeping the pressurized air in the second piston cylinder 14 instead of bottled up in the passageway 60. By using this configuration, the air compressor 10 may provide more compressed air than if the pressurized air were permitted to escape into the passageway 60. Further, in one aspect, the tapered lower portion 80 of the valve connector 68 may be configured to slide or fit into the transition passage 72 of the passageway 60. The angle of inclination of the tapered lower portion 80 of the valve connector 68 may substantially correspond to the angle of inclination of the transition passage 72. By positioning the tapered lower portion 80 of the valve connector 68 together with the transition passage 72, the reduction in clearance volume may be further limited. It is also contemplated that the volume between the unloader valve 58 and the volume 54 may be reduced. This may be achieved by establishing a seal (for example, an O-ring) between the transition passage 72 and the tapered lower portion 80 of the valve connector 68. This may also be achieved by reducing the overall length of the valve connector 68 to increase the length of second passageway 70b. In one aspect, it is contemplated that the diameter of the second passageway 70b should be as small as allowable.

The valve connector 68 may be configured to provide a positive steal between atmosphere and the internal pressurized volume 54 of the air compressor 10 so that pressurized air does not inadvertently leak from the volume 54. In aspect, it is also to be understood that the valve connector 68 may be attached to the cylinder head 32 via fasteners or adhesives depending on the configuration of the cylinder head 32. By providing the proper connection between the valve connector 68 and the cylinder head 32, an effective positive seal between the valve connector 68 and the cylinder head 32 may be established. The valve connector 68 may be made of a thermally resistant material to minimize the heat transfer from the cylinder head 32 to the unloader valve 58. In one aspect, the valve connector 68 may be made from a glass-filled nylon with a low thermal conductivity.

With reference to FIG. 4, a method of unloading pressurized air from an air compressor 10 is described in detail. An air compressor 10 including an unloader valve 58 and valve connector 68 as described hereinabove may be provided on a railway vehicle 42. During normal operation of the railway vehicle 42, the unloader valve 58 is provided in a closed position so no pressurized air is permitted to exhaust to atmosphere. Upon the railway vehicle 42 experiencing a shutdown condition, the unloader valve 58 may be opened to allow pressurized air trapped in the volume 54 to exhaust to atmosphere via the exhaust port 64 on the unloader valve 58. The pressurized air may be directed from the volume 54 through the second passage 70b of the passageway 60 through the through hole 82 of the valve connector 68 and out the exhaust port 64 of the unloader valve 58. In this manner, downstream air pressure trapped or contained in the volume 54 may be exhausted from the second piston cylinder 14 to increase the efficiency of the air compressor 10 upon restarting the air compressor 10.

With continued reference to FIGS. 4, 8, and 9, a method of incorporating an unloader valve 58 with an air compressor 10 is now described. The cylinder head 32 may include a pre-exiting female threaded connection 69 that is configured to be a lifting point for the air compressor 10. According to the disclosed method, a recess or spot face 71 may be machined into a top surface of the cylinder head 32. Further according to this method, a lower portion of the first passage 70a of the passageway 60 of the cylinder head 32 may be female tapped to provide a female threaded connection in the first passage 70a of the passageway 60. In one aspect, this female threaded connection may have a diameter that is smaller than the pre-exiting female threaded connection 69. Further, the bottom portion of the passageway 60 may be drilled through to the volume 54 of the second piston cylinder 14. This drilled section creates the second passage 70b of the passageway 60. One of ordinary skill in the art will readily understand the different methods available for drilling the second passage 70b of the passageway 60, including a drill press or upright drilling process, among others. After the second passage 70b has been drilled, the valve connector 68 may be inserted into the passageway 60. The upper portion 74 of the valve connector 68 may be rotated with any common tools, such as a wrench or plier grips, so that the valve connector 68 is moved further into the passageway 60. The female threaded lower portion of the first passage 70a may engage with the male threaded portion 78 of the valve connector 68, thereby establishing a connection between the cylinder head 32 and the valve connector 68. It is also to be understood that the first passage 70a may include a male threaded portion and the threaded portion 78 of the valve connector 68 may have a female threaded portion. The upper portion 74 of the valve connector 68 may be rotated until the valve connector 68 is securely fit within the cylinder head 32. In this position, the upper portion 74 of the valve connector 68 may rest on the recess 71 formed in the cylinder head 32. The O-ring 84 may be positioned between the upper portion 74 of the valve connector 68 and the recess 71 to form a seal between the valve connector 68 and the cylinder head 32. In a similar fashion, an attachment portion 86 of the unloader valve 58, positioned on a bottom surface of the unloader valve 58, may be threadedly connected to the threaded portion of the through hole 82 of the upper portion 74 of the valve connector 68. In this manner, the valve connector 68 and the unloader valve 58 may be connected to one another. By assembling the unloader valve 58 on the air compressor 10 according to this method, fluid communication between atmosphere and the volume 54 may be established.

While several aspects of an air compressor including an unloader valve and valve connector are shown in the accompanying figures and described hereinabove in detail, other aspects will be apparent to, and readily made by, those skilled in the art without departing from the scope and spirit of this invention. Accordingly, the foregoing description is intended to be illustrative rather than restrictive. The invention described hereinabove is defined by the appended claims and all changes to the invention that fall within the meaning and the range of the equivalency of the claims are to be embraced within their scope.

The invention claimed is:

1. A valve connector for fluidly connecting an air compressor piston cylinder to an unloader valve, comprising:
 an upper portion;
 a connecting portion;
 an extended intermediate portion positioned between the upper portion and the connecting portion; and
 a lower tapered portion positioned on a bottom surface of the connecting portion,
 wherein the valve connector defines a through hole extending from a top surface of the upper portion thereof to a bottom surface of the lower tapered portion thereof, wherein the through hole is fluidly connected to an exhaust port of the unloader valve, and wherein the through hole is configured to permit pressurized air from the piston cylinder to exhaust from the exhaust port of the unloader valve along a path extending through the through hole from the bottom surface of the lower tapered portion of the valve connector to the upper portion of the valve connector.

2. The valve connector as claimed in claim 1, wherein the connecting portion is threaded.

3. The valve connector as claimed in claim 1, wherein an upper portion of the through hole is threaded.

4. The valve connector as claimed in claim 1, wherein the upper portion comprises a hexagonal cross-sectional shape.

5. The valve connector as claimed in claim 1, wherein the lower tapered portion comprises an inclined surface that transitions from a larger diameter to a smaller diameter.

6. The valve connector as claimed in claim 1, further comprising an O-ring positioned around the extended intermediate portion and against a bottom surface of the upper portion.

7. The valve connector as claimed in claim 1, wherein the extended intermediate portion has a smaller diameter than a diameter of the upper portion and a diameter of the connecting portion.

8. The valve connector as claimed in claim 1, wherein a diameter of the upper portion is greater than a diameter of the extended intermediate portion, a diameter of the connecting portion, and a diameter of the tapered lower portion.

9. An air compressor for a railway vehicle, comprising:
a compressor housing;
at least one piston cylinder supported in the compressor housing, the at least one piston cylinder comprising a cylinder head;
a crankshaft assembly supported by the compressor housing and linked to a piston of the at least one piston cylinder; and
a valve connector provided on the cylinder head of the at least one piston cylinder and fluidly connecting the piston cylinder to an unloader valve, the valve connector comprising:
an upper portion;
a connecting portion;
an extended intermediate portion positioned between the upper portion and the connecting portion; and
a lower tapered portion positioned on a bottom surface of the connecting portion,
wherein the unloader valve is coupled to the upper portion of the valve connector, and the valve connector defines a through hole extending from a top surface of the upper portion thereof to a bottom surface of the lower tapered portion thereof, the through hole configured to permit pressurized air from the piston cylinder to exhaust from an exhaust port of the unloader valve along a path extending through the through hole from the bottom surface of the lower tapered portion of the valve connector to the upper portion of the valve connector.

10. The air compressor as claimed in claim 9, wherein the connecting portion is threaded.

11. The air compressor as claimed in claim 9, further comprising a passageway defined in the cylinder head, the passageway comprising a first passage, a second passage, and a transition passage provided between the first and second passages, wherein the valve connector is configured for insertion into the first passage of the passageway defined in the cylinder head.

12. The air compressor as claimed in claim 11, wherein the transition passage comprises a tapered portion, and wherein the tapered portion of the transition passage and the lower tapered portion of the valve connector are configured to correspond to one another.

13. The air compressor as claimed in claim 11, wherein the first passage of the passageway comprises a threaded portion, wherein the threaded portion of the first passage is threadedly coupled to the connecting portion of the valve connector.

14. The air compressor as claimed in claim 9, wherein a diameter of the upper portion is greater than a diameter of the extended intermediate portion, a diameter of the connecting portion, and a diameter of the tapered lower portion.

15. The air compressor as claimed in claim 9, wherein the extended intermediate portion has a smaller diameter than a diameter of the upper portion and a diameter of the connecting portion.

* * * * *